US008140739B2

(12) United States Patent
Langlois et al.

(10) Patent No.: US 8,140,739 B2
(45) Date of Patent: Mar. 20, 2012

(54) FLASH MEMORY BASED STORAGE DEVICES UTILIZING MAGNETORESISTIVE RANDOM ACCESS MEMORY (MRAM) TO STORE FILES HAVING LOGICAL BLOCK ADDRESSES STORED IN A WRITE FREQUENCY FILE BUFFER TABLE

(75) Inventors: Denis J. Langlois, River Falls, WI (US); Alan R. Olson, Cottage Grove, MN (US)

(73) Assignee: Imation Corp., Oakdale, MN (US)

( * ) Notice: Subject to any disclaimer, the term of this patent is extended or adjusted under 35 U.S.C. 154(b) by 810 days.

(21) Appl. No.: 12/228,033

(22) Filed: Aug. 8, 2008

(65) Prior Publication Data

US 2010/0037001 A1    Feb. 11, 2010

(51) Int. Cl.
*G06F 13/00* (2006.01)
(52) U.S. Cl. .......... 711/103; 710/52; 365/158; 711/161; 711/202; 711/5
(58) Field of Classification Search .................. 711/103, 711/3, 5, 117, 118, 161, 202; 365/158
See application file for complete search history.

(56) References Cited

U.S. PATENT DOCUMENTS

| | | | | |
|---|---|---|---|---|
| 6,363,009 B1 * | 3/2002 | Fukuzumi | ................. | 365/185.03 |
| 6,725,321 B1 * | 4/2004 | Sinclair et al. | ................. | 711/103 |
| 7,353,324 B2 * | 4/2008 | Tanaka | ........................... | 711/103 |
| 7,610,445 B1 * | 10/2009 | Manus et al. | ................. | 711/113 |
| 2004/0193782 A1 * | 9/2004 | Bordui | ........................... | 711/103 |
| 2005/0251617 A1 * | 11/2005 | Sinclair et al. | ................. | 711/103 |
| 2006/0256610 A1 * | 11/2006 | Qureshi et al. | ................. | 365/158 |
| 2006/0274566 A1 * | 12/2006 | Takashima et al. | ........... | 365/145 |

OTHER PUBLICATIONS

Jim Handy, "The Cache Memory Book", 1993, Academic Press, pp. 37-107.*
"A 0.18 μm 4Mb Toggling MRAM," M. Durlam et al, published in IEDM Technical Digest 2005, Session 34 #6, 3 pages.
Brochure entitled "MRAM Technical Guide" from Freescale Semiconductor, Document No. BRMRAMTECHGUIDE, Rev. 1, 2007, 4 pages.
Brochure entitled "MRAM Fact Sheet" from Freescale Semiconductor, Document No. MRAMTECHFS, Rev. 6, 2007, 2 pages.

* cited by examiner

*Primary Examiner* — Hong Kim
(74) *Attorney, Agent, or Firm* — Shumaker & Sieffert, P.A.

(57) ABSTRACT

A flash memory based storage device may utilize magnetoresistive random access memory (MRAM) as at least one of a device memory, a buffer, or high write volume storage. In some embodiments, a processor of the storage device may compare a logical block address of a data file to a plurality of logical block addresses stored in a write frequency file buffer table and causes the data file to be written to the high write volume MRAM when the logical block address of the data file matches at least one of the plurality of logical block addresses stored in the write frequency file buffer table. In other embodiments, upon cessation of power to the storage device, the MRAM buffer stores the data until power is restored, after which the processor causes the buffered data to be written to the flash memory under control of the flash memory controller.

8 Claims, 12 Drawing Sheets

FLASH MEMORY BASED STORAGE
DEVICES UTILIZING MAGNETORESISTIVE
RANDOM ACCESS MEMORY (MRAM) TO
STORE FILES HAVING LOGICAL BLOCK
ADDRESSES STORED IN A WRITE
FREQUENCY FILE BUFFER TABLE

TECHNICAL FIELD

The present disclosure relates to flash memory based storage devices.

BACKGROUND

The explosion of flash memory technology has dramatically increased the storage capacity and decreased the cost of non-volatile semiconductor memory. The technology has fueled the proliferation of Universal Serial Bus (USB) flash drives and is poised to replace magnetic hard disks in some applications. A solid state drive (SSD) is a flash memory-based storage device that emulates a magnetic hard disk drive (HDD). SSDs do not contain any moving parts and depend on flash memory chips to store data. Benefits of SSDs over HDDs include higher data transfer rates, lower data access time, improved shock and vibration tolerance, and reduced power consumption. For some applications, the benefits outweigh the higher cost of an SSD relative to an HDD.

SUMMARY

In general, the current disclosure is directed to the use of magnetoresistive random access memory (MRAM) in flash memory-based data storage devices, such as an SSD. MRAM combines a speed approximately equal to or greater than SRAM with non-volatile data storage. MRAM stores data in oriented magnetic fields and reads the data based on changes in electrical resistance. MRAM may be used as a replacement for at least one of the SRAM device memory and/or the SDRAM buffer, or as an additional storage medium for high write volume data.

In one embodiment, the disclosure is directed to a storage device including flash memory and a flash memory controller that controls at least one of addressing, programming, erasing and reading of the flash memory. The storage device further includes a host interface for communicating with a host device, a magnetoresistive random access memory (MRAM) buffer electrically connected between the host interface and the flash controller, and a processor that receives commands from the host device via the host interface and coordinates the at least one of addressing, programming, erasing and reading of the flash memory by the flash memory controller. The MRAM buffer receives data via the host interface and stores the data until the data is written to the flash memory under control of the flash memory controller. Upon cessation of power to the storage device, the MRAM buffer stores the data until power is restored, after which the processor causes the buffered data to be written to the flash memory under control of the flash memory controller.

In another embodiment, the disclosure is directed to a storage device including flash memory, a host interface for communicating with a host device, a processor that receives commands from the host device via the host interface and coordinates the at least one of addressing, programming, erasing and reading of data to or from the flash memory, and a buffer electrically connected between the host interface and the flash memory. The storage device further includes a high write volume magnetoresistive random access memory (MRAM) electrically connected between the host interface and the flash controller. The processor compares a logical block address of a data file to a plurality of logical block addresses stored in a write frequency file buffer table and causes the data file to be written to the high write volume MRAM when the logical block address of the data file matches at least one of the plurality of logical block addresses stored in the write frequency file buffer table.

In another embodiment, the disclosure is directed to a method including comparing a logical block address of a data file to a plurality of logical block addresses stored in a write frequency file buffer and writing the data file to a high write volume magnetoresistive random access memory (MRAM) memory when the logical block address of the data file matches at least one of the plurality of logical block addresses stored in the write frequency file buffer.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
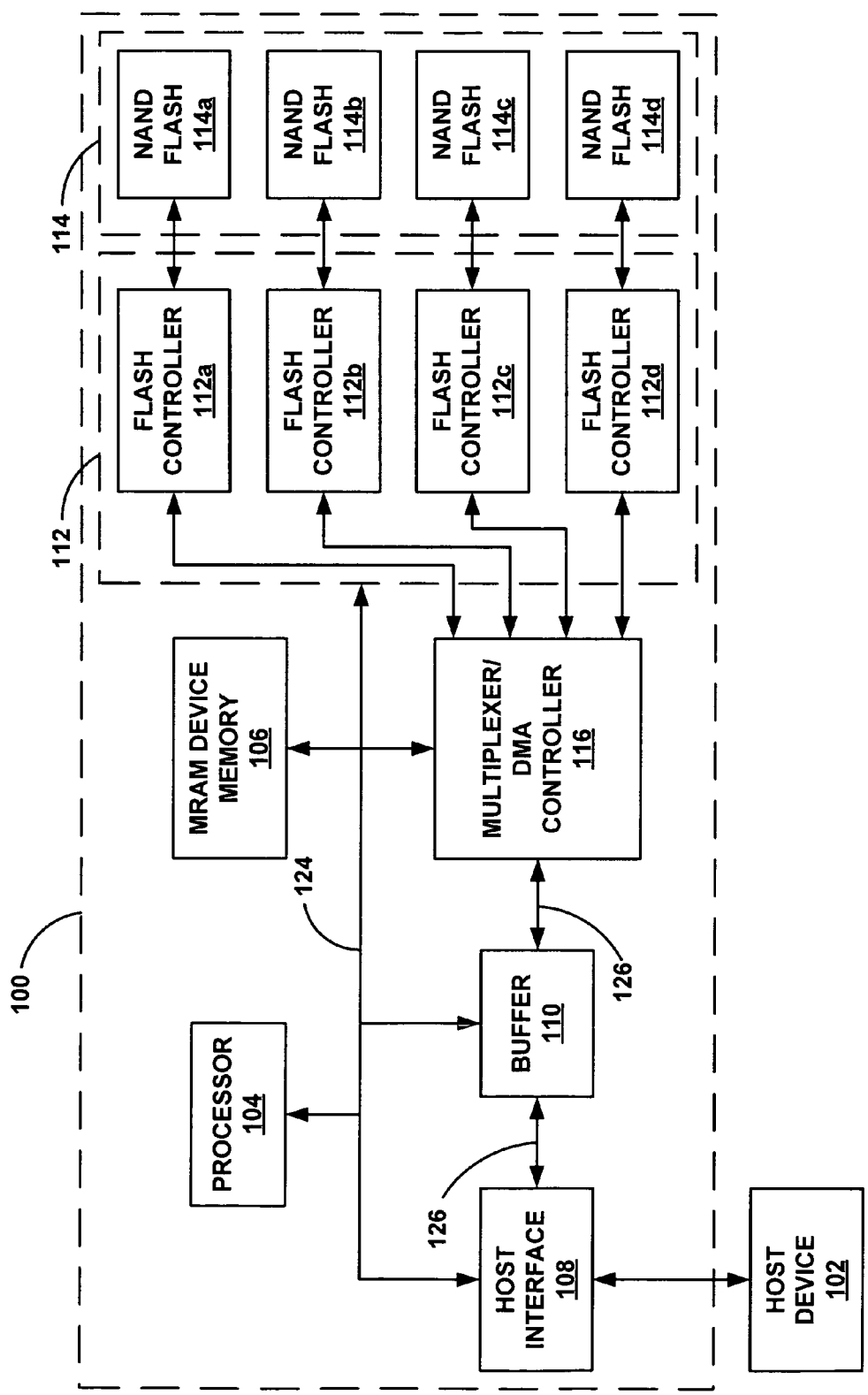
FIG. 1 is a schematic block diagram illustrating an example solid state drive including a magnetoresistive random access memory (MRAM) device memory.

Flash-based memory devices include, for example, USB flash drives and memory cards for consumer electronics devices such as cameras, cell phones, videogame consoles, and the like. One emerging use of flash-based memory devices is a solid state drive (SSD), which may be used as a replacement for a conventional hard disk drive (HDD) in devices such as laptop computers, servers and other computing devices. While the following description is generally directed to SSDs, it will be understood that the techniques described herein may be applicable to other flash-based memory devices including, but not limited to, those listed above.

An SSD may include a synchronous dynamic random access memory (SDRAM) buffer, which stores data received from a host device prior to the data being written to flash memory. Additionally, an SSD may include a static random access memory (SRAM) device memory, which is used by a processor within the SSD to store data including a flash translation layer (FTL) and wear-leveling algorithms, and also provides working memory for the processor. The flash translation layer includes a logical-to-physical address mapping table and an associated erase count table. Each of the SDRAM and SRAM are considered volatile memory, because the contents of the memory are lost when power is not provided to the memory. This complicates construction and operation of the SSD, as a short-term power source is required to enable the contents of the SDRAM buffer and SRAM device memory to be written to the non-volatile flash memory in the event of a power interruption. Additionally, the flash translation layer and wear-leveling algorithms must periodically be backed up to the flash memory, and further, the wear-leveling algorithms must be written to include the backed up flash translation layer and wear-leveling algorithm data in the wear-leveling algorithm.

In general, the current disclosure is directed to the use of magnetoresistive random access memory (MRAM) in flash memory-based data storage devices, such as an SSD. MRAM combines a speed approximately equal to or greater than SRAM with non-volatile data storage. MRAM stores data in oriented magnetic fields and reads the data based on changes in electrical resistance. MRAM may be used as a replacement for at least one of the SRAM device memory and/or the SDRAM buffer, or as an additional storage medium for high write volume data.

The use of MRAM may simplify the construction and/or improve operation of the SSD. For example, because MRAM is non-volatile memory, the contents of a MRAM device memory do not need to be periodically backed-up to flash memory, thus simplifying the wear-leveling algorithm. Further, use of MRAM for the instead of SDRAM in the buffer and SRAM in the device memory may eliminate the need for a short-term power source to allow writing of the data stored in the buffer and device memory to flash memory in the event of a power interruption. Use of MRAM as an additional storage medium for high write volume data may improve access times to the high write volume data and increase the lifetime of the flash memory by decreasing the number of write/erase cycles experienced by the flash memory.

FIG. 1 is a schematic block diagram illustrating an example SSD 100 connected to a host device 102. Host device 102 may include, for example, a desktop or laptop computer, a server, a portable electronics device such as a music or video player, or the like. Host device 102 includes a processor which controls operation of the host device 102. The processor of host device 102 and SSD 100 communicate via a host interface 108. Host interface 108 may include, for example, a parallel advanced technology attachment (PATA) interface, a serial advanced technology attachment (SATA) interface, a small computer system interface (SCSI) interface, a serial attached SCSI (SAS) interface, or the like. Because SSD 100 communicates with the processor of host device 102 via a similar host interface 108 as done with a conventional hard disc drive (HDD), SSD 100 may be a drop-in replacement for an HDD. Host interface 108 may connect to a control bus 124 and a data bus 126 in the SSD 100. Control bus 124 is used for addressing and control of the components of SSD 100, and data bus 126 provides a data path between host interface 108 and first NAND flash memory channel 114a, second NAND flash memory channel 114b, third NAND flash memory channel 114c and fourth NAND flash memory channel 114d (collectively "NAND flash memory 114"). Each of data bus 126 and control bus 124 may be an 8 bit or 16 bit bus, which transfers data or commands in byte (8 bits) or word (multiple bytes) lengths.

Control bus 124 may connect to a processor 104, a magnetoresistive random access memory (MRAM) device memory 106, host interface 108, a buffer 110, a multiplexer/direct memory access (DMA) controller 116, first flash memory controller 112a, second flash memory controller 112b, third flash memory controller 112c and fourth flash memory controller 112d (collectively "flash memory controllers 112"). MRAM device memory 106 may store control information pertinent to writing and reading data to and from NAND flash memory 114. For example, the control information may include a flash translation layer (FTL) that is comprised of at least one of erase count tables and flash translation mapping tables, and which is described in further detail with respect to FIG. 5. Additionally, MRAM device memory 106 may provide high-speed memory access for use by processor 104. MRAM is a non-volatile memory that stores data in the form of oriented magnetic fields, and reads the data based on electrical resistance due to the orientated magnetic fields, as described in further detail with respect to FIGS. 2A-C. The use of non-volatile MRAM in MRAM device memory 106 may enable storage of the erase count tables and flash translation mapping tables, and any other data stored in the MRAM device memory 106, without requiring periodic back-up of the data to NAND flash memory 114. This may simplify wear-leveling algorithms performed by processor 104 to manage wear of the NAND flash memory 114, as described in further detail below.

Processor 104 is the main controller for the operation of SSD 100. Processor 104 coordinates the writing and reading of data to and from the NAND flash memory 114 by flash memory controllers 112. Processor 104 also executes and monitors wear-leveling algorithms that utilize the erase count tables and/or flash translation mapping tables stored in MRAM device memory 106 to prolong the useful life of NAND flash memory 114. Processor 104 may include a microprocessor, digital signal processor (DSP), application specific integrated circuit (ASIC), field programmable gate array (FPGA), or other digital logic circuitry, and in some embodiments, may be a microprocessor based on the ARM architecture developed and licensed by ARM Holdings, Cambridge, England, UK.

Each of flash memory controllers 112a, 112b, 112c and 112d perform the intimate control of addressing, programming, erasing, and reading of a respective one of first, second, third and fourth NAND flash memory channels 114a, 114b, 114c and 114d under the direction of processor 104. While FIG. 1 illustrates four flash memory controllers 112a, 112b, 112c and 112d, each associated with a respective NAND flash memory channel 114a, 114b, 114c or 114d, in other embodiments, SSD 100 may include less than four or more than four flash memory controllers 112 and associated NAND flash memory channels 114. Typically, the number of flash memory controllers 112 and NAND flash memory channels 114a, 114b, 114c and 114d are powers of two, e.g., 1, 2, 4, or 8, to provide efficient parallel writing of data to NAND flash memory 114.

Each of flash memory controllers 112 may receive a write command from processor 104 via control bus 124 and control the writing of data to the respective first, second, third or fourth NAND flash memory channel 114a, 114b, 114c or 114d. Similarly, each of flash memory controllers 112 may receive a read command from processor 104 via control bus 124 and control the reading of data from the respective first, second, third or fourth NAND flash memory channel 114a, 114b, 114c or 114d. By integrating a plurality of NAND flash memory channels 114, a plurality of writes and/or reads of data can be performed in one clock cycle. For example, by including first, second, third and fourth flash memory controllers 112a, 112b, 112c and 112d, as shown in FIG. 1, four bytes of data may be read and/or written substantially simultaneously (e.g., in a single clock cycle). In contrast, an SSD that includes only a single flash memory controller may be capable of reading or writing only a single byte of data in one clock cycle. Generally, the number of flash memory controllers 112 determines the number of bytes that may be read and/or written substantially simultaneously (e.g., in a single clock cycle) and, accordingly, increasing the number of flash memory controllers 112 may increase the amount of data that can be read and/or written substantially simultaneously.

Each of flash memory controllers 112 also electrically connect to multiplexer/direct memory access (DMA) controller 116 via data bus 126. Multiplexer/DMA controller 116 accepts input data from each of flash memory controllers 112 and outputs all data received from controllers 112 to a single output, data bus 126. Additionally, multiplexer/DMA controller 116 accepts data to be written to NAND flash memory 114 from buffer 110 and outputs the data to first, second, third and fourth flash memory controllers 112a, 112b, 112c and 112d. The operation of multiplexer/DMA controller 116 is directed by processor 104 via control bus 124.

Data received from host device 102 is typically transferred in either 32 bit or 64 bit words via host interface 108 to buffer 110 via data bus 126. Buffer 110 stores the data temporarily until the flash memory controllers 112a, 112b, 112c, and 112d are free to write the data to flash memory 114, at which time the data is transferred to multiplexer/DMA controller 116 and flushed from buffer 110. Multiplexer/DMA controller 116 then splits the words into bytes (e.g., 4 bytes for a 32 bit word or 8 bytes for a 64 bit word) and transfers the bytes to flash memory controllers 112 under directions of processor 104. For example, when host device 102 transfers a 32 bit word to SSD 100, multiplexer/DMA controller 116 splits the 32 bit word into 4 bytes and transfers one byte to each of first, second, third and fourth flash memory controllers 112a, 112b, 112c and 112d. First, second, third and fourth flash memory controllers 112a, 112b, 112c and 112d write the data to the corresponding first, second, third and fourth NAND flash memory channel 114a, 114b, 114c and 114d in parallel. Buffer 110 may be comprised of synchronous dynamic random access memory (SDRAM).

When host device 102 requires data to be read from NAND flash memory 114, device 102 sends a read command including a logical block address (LBA) of the data through host interface 108, which transfers the read command to processor 104. Processor 104 determines the corresponding physical block address (PBA) of the data from a flash translation layer (FTL) table stored in MRAM device memory 106, as described in further detail with respect to FIG. 5. Processor 104 then directs flash memory controllers 112 to read the data from the physical block indicated by the physical block address. Flash memory controllers 112 read the data bytes and transfer the data bytes to multiplexer/DMA controller 116, which combines the data bytes into the appropriate word length (e.g., 32 bit or 64 bit) and transfers the data on data bus 126 to host interface 108, which sends the data to host device 102.

Figure 2A:
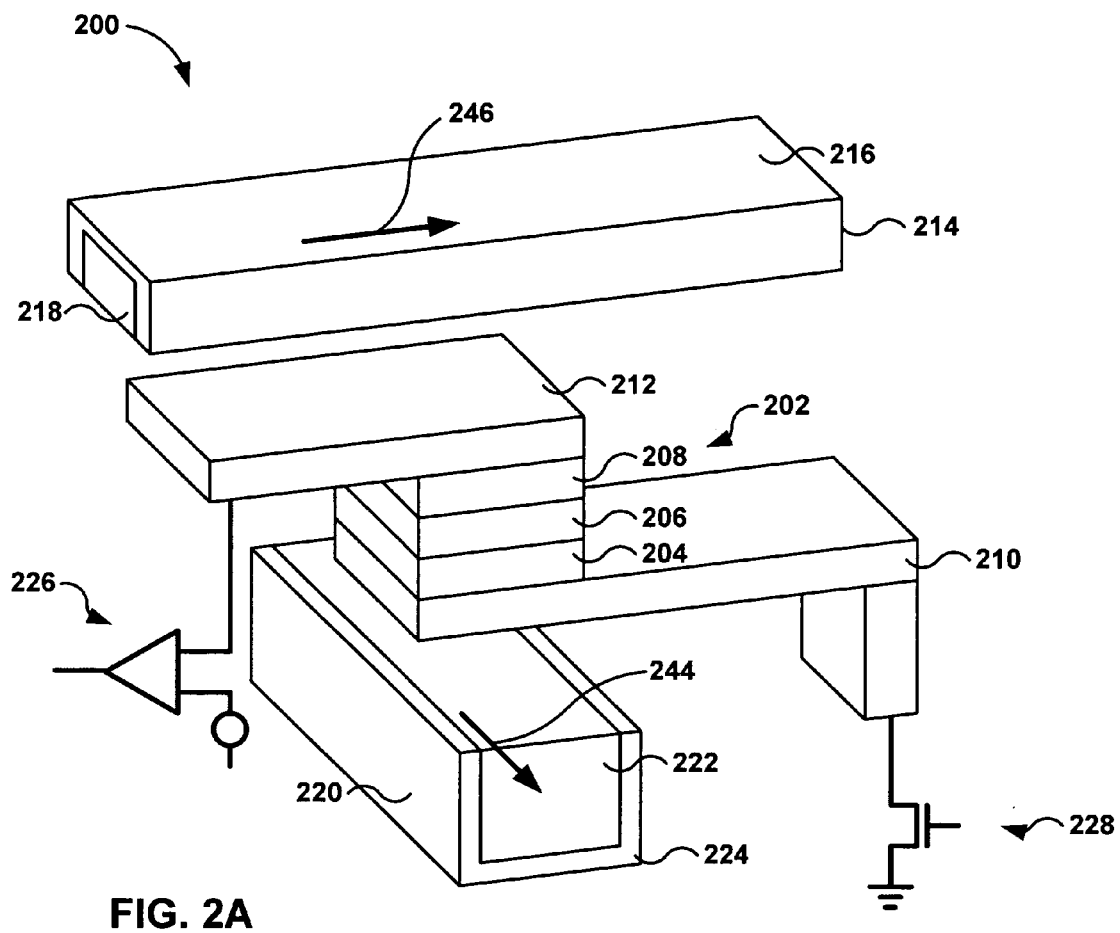
FIG. 2A-2C are conceptual perspective diagrams of an example MRAM flash memory cell.
Figure 2A:
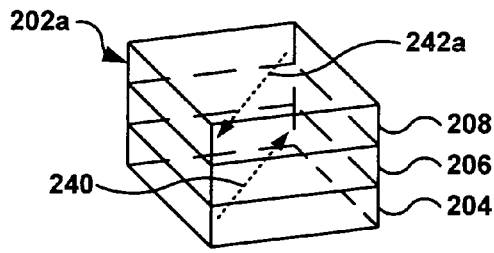
Figure 2B:
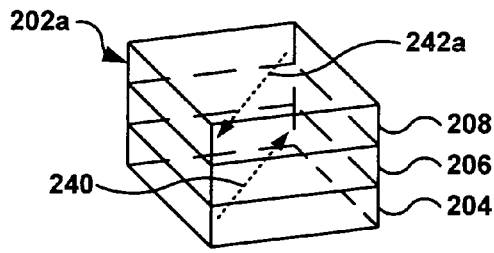
Figure 2C:
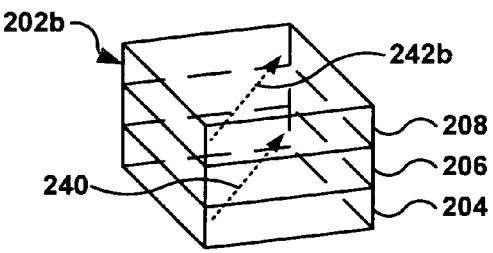

FIGS. 2A-2C are conceptual perspective diagrams of an example MRAM cell 200 of MRAM device memory 106. MRAM cell 200 may include a bit line 214 and a digit line 224, which are used to program MRAM cell 200. Bit line 214 and digit line 224 include inlaid copper interconnects 218 and 222, respectively, each of which is at least partially enclosed in flux concentrating cladding layers 216 and 220, respectively. Flux concentrating cladding layers 216 and 220 increase the magnetic flux applied to a magnetic tunnel junction (MTJ) 202. MTJ 202 includes a pinned ferromagnetic layer 204, a tunnel barrier layer 206 and a free layer 208. Pinned ferromagnetic layer 204 includes a pinned magnetic moment 240, illustrated in FIGS. 2B and 2C. In the illustrated embodiment, pinned magnetic moment 240 is oriented at an approximately 45 degree angle to bit line 214 and digit line 224. Free layer 208 includes a free magnetic moment 242 that is free to rotate under influence of a sufficiently strong applied magnetic field, as illustrated in FIGS. 2B and 2C.

The applied magnetic field is produced by pulses of electric current flowing through bit line 214 and digit line 224. Consider an example which free magnetic moment 242 begins with the orientation of first free magnetic moment 242a. Electric current is sent through digit line 224 in the direction indicated by arrow 244 and the magnetic moment of free layer 208 rotates to be substantially parallel to arrow 244. While electric current still flows through digit line 224, current is sent through bit line 214 in a direction indicated by arrow 246, bringing the free magnetic moment 242 to a substantially 45 degree angle between arrows 244 and 246. Current flow through digit line 224 is then ceased, and the free magnetic moment 242 rotates to be substantially parallel to the direction of current flow through bit line 214, indicated by arrow 246. Finally, current flow through bit line 214 is ceased, and the free magnetic moment 242 rotates to be oriented in the direction indicated by second free magnetic moment 242b.

The relative orientation of the pinned magnetic moment 240 and the free magnetic moment 242 determines the resistance of MTJ 202. For example, the resistance of MTJ 202a, in which pinned magnetic moment 240 and first free magnetic moment 242a are oriented substantially anti-parallel, is greater than the resistance of MTJ 202b, in which pinned magnetic moment 240 and second free magnetic moment 242b are oriented substantially parallel. The relative resistance of the MTJ 202 may be determined by flowing current from transistor 228 through bottom electrode 210 to MTJ 202, through bottom electrode 212 and to op-amp 226, where the current is compared to a baseline or standard current. The relative resistance is the storage mechanism of cell 200. For example, a high resistance may correspond to a logical state of "1," while a low resistance may correspond to a logical state of "0."

Because the resistance of the MTJ 202 is related to the magnetic moment 242 of the free layer 208, MRAM cell 200 may store information indefinitely in the absence of an applied magnetic field that is sufficiently strong to change the orientation of the magnetic moment 242. This non-volatility removes the need for periodic refreshing of the contents of cell 200. Additionally, because MRAM cell 200 includes a single transistor and a single MTJ 202, MRAM arrays may include a high cell density, which correlates to a low cost of the memory. Furthermore, MRAM may operate at speeds similar to SRAM.

Returning to FIG. 1, NAND flash memory 114 is the non-volatile mass storage media of SSD 100. NAND flash memory 114 arranges individual memory cells (e.g., flash memory cell 400 of FIG. 4) in a logical not-and (NAND) configuration. The NAND configuration strings together multiple cells such as, for example, all of the cells of a block, for a common input/output bit across all memory pages in the block.

Figure 3:
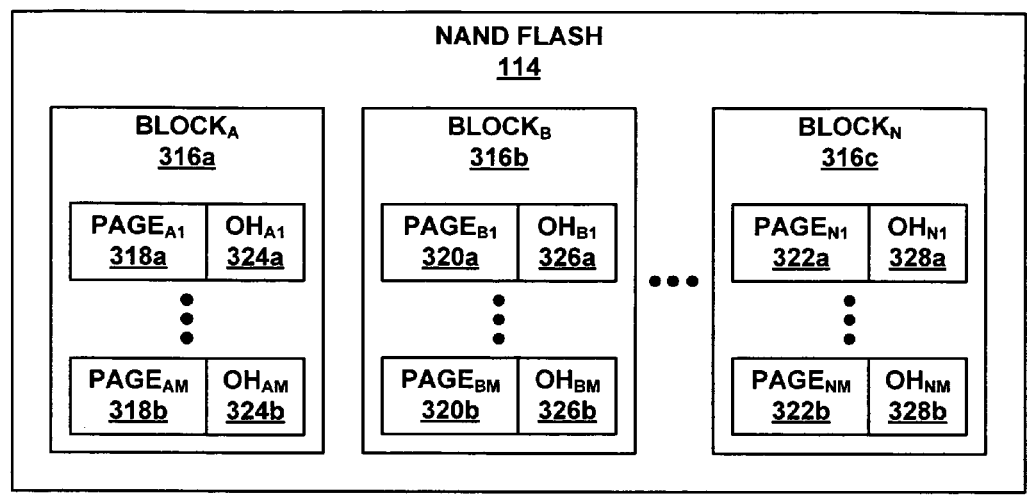
FIG. 3 is a conceptual block diagram of a NAND flash memory.

As shown in FIG. 3, NAND flash memory channel 114a (and similarly, NAND flash memory channels 114b, 114c and 114d) organizes stored data in a plurality of blocks, and each block includes a plurality of pages. In the embodiment illustrated in FIG. 3, NAND flash memory channel 114a includes a plurality of blocks, $BLOCK_A$ 316a, $BLOCK_B$ 316b, ..., $BLOCK_N$ 316c (collectively BLOCKS 316), where N is a positive integer greater than one. Each of BLOCKS 316 includes a plurality of pages: $BLOCK_A$ 316a includes $PAGE_{A1}$ 318a, ..., $PAGE_{AM}$ 318b, where M is a positive integer greater than one; $BLOCK_B$ 316b includes $PAGE_{B1}$ 320a, ..., $PAGE_{BM}$ 320b, where M is a positive integer greater than one; and $BLOCK_N$ 316c includes $PAGE_{N1}$ 322a, ..., $PAGE_{NM}$ 322b, where M is a positive integer greater than one (collectively PAGES 318). Each page of PAGES 318 has associated with it respective overhead bytes. For example, $PAGE_A$, 318a, ..., $PAGE_{AM}$ 318c are associated with overhead bytes $OH_{A1}$ 324a, ..., $OH_{AM}$ 324c, respectively. Similarly, $PAGE_{B1}$ 320a, ..., $PAGE_{BM}$ 320b are associated with overhead byes $OH_{B1}$ 326a, ..., $OH_{BM}$ 326b, and $PAGE_{N1}$ 322a, ..., $PAGE_{NM}$ 322c are associated with overhead bytes $OH_{N1}$ 328a, ..., $OH_{NM}$ 328c, respectively. The overhead bytes may store data such as error correction codes for determining errors in the data stored in the associated page of PAGES 318 and indexing information used by flash memory controllers 112 for determining the physical location of each of the associated PAGES 318.

Each page of PAGES 318 may include a plurality of bytes, and each byte includes 8 bits, each of which is stored in a single flash memory cell. Each block may contain a plurality of pages, and a single flash memory channel may contain a plurality of blocks. For example, each block may include 32 or 64 PAGES 318. Each page may include, for example, 512, 2,048 or 4,096 bytes of user data and have associated with it 64 overhead bytes. In some embodiments, the flash memory controller may divide the 2048 bytes of user data in each page into four sectors of 512 bytes, which is a typical size for HDD sectors.

Figure 4:
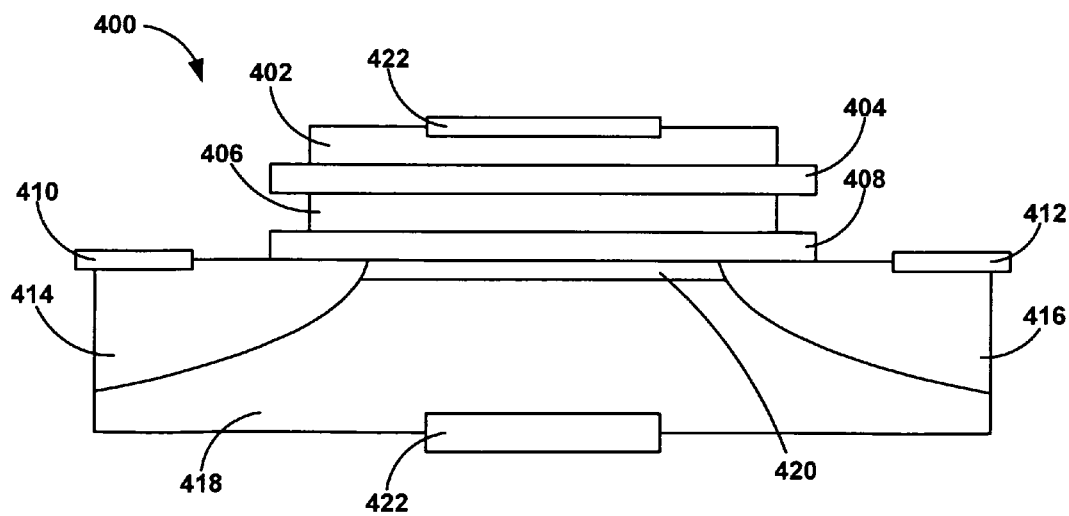
FIG. 4 is a conceptual diagram illustrating an example NAND flash memory cell.

FIG. 4 illustrates a conceptual diagram of an example flash memory cell 400. Flash memory cell 400 is a metal-oxide-semiconductor field-effect transistor (MOSFET) with the addition of a floating gate 406. Flash memory cell 400 includes a silicon substrate 418, into which impurities are implanted to form a source region 414 and a drain region 416. Silicon substrate 418 electrically couples to a substrate electrode 422. A source electrode 410 electrically couples to a portion of source region 414, and a drain electrode 412 electrically couples to a portion of drain region 416. An oxide insulating layer 408, which may include, for example, silicon dioxide ($SiO_2$), is formed over the silicon substrate 418 and overlaps a portion of both source region 414 and drain region 416. A floating gate 406 is formed over the oxide insulating layer 408, with a second insulating layer 404 formed over floating gate 406, and a control gate 402 formed over second insulating layer 404. Floating gate 406 is electrically unconnected from the remainder of the cell 400. Control gate 402 electrically couples to a control electrode 402.

Data is stored in cell 400 as electric charge (i.e., electrons) on floating gate 408. For example, when electric charge is added to floating gate 406, cell 400 may be considered in the programmed state, which may correspond to a logic level "0." Conversely, when electric charge is removed from floating gate 406, cell 400 may be considered in the erased state, which may correspond to a logic level "1." The state of cell 400 is stable over relatively long periods of time (e.g., greater than approximately 10 years), because floating gate 406 is electrically insulated from the remainder of cell 400, so any leakage of charge to or from floating gate 406 is very gradual.

Each page of PAGES 318 includes a plurality of cells 400 in close physical proximity to each other. Similarly, each block of BLOCKS 316 includes a plurality of PAGES 318 in close physical proximity to each other, and thus, a plurality of cells 400 in close physical proximity to each other. Each of the plurality of cells 400 within a block shares a silicon substrate 418.

Data is erased from NAND flash memory 114 by applying a high voltage to silicon substrate 418 through substrate electrode 422 while holding control gate 402 at zero volts. Any electric charge (i.e., electrons) stored in floating gate 406 tunnels through oxide insulating layer 408 into positively charged substrate 418. Because cells 400 included in $BLOCK_A$ 316a share the same silicon substrate 418 and are in relatively close physical proximity to each other, the high voltage applied to silicon substrate 418 through substrate electrode 422 is applied to all cells 400 in $BLOCK_A$ 316a and erasing data from NAND flash memory 114 is performed on a block level (e.g., $BLOCK_A$ 316a). Cell- or page-level erasing is not generally practiced in NAND flash memory 114.

As described briefly above, in NAND flash memory 114, all of cells 400 in a block (e.g., $BLOCK_A$ 316a) are connected to a common input/output bit line across all memory pages. Thus, data is read from and, typically, written to NAND flash memory 114 in page units. For example, all the data stored in $PAGE_{A1}$ 318a must be read sequentially; there is no direct bit or byte level access to data stored in $PAGE_{A1}$ 318a, or any other page.

Programming of cell 400 is performed by applying a high voltage on control gate 402 via control electrode 422 while holding source region 414 and drain region 416 at zero volts. The high electric field produced by control gate 402 creates a more highly conductive channel 420 with a relatively high electron density to form adjacent the interface of oxide insulating layer 408 and silicon substrate 418. The high electric field causes at least some of the electrons to tunnel through oxide insulating layer 408 into floating gate 406, increasing the charge on floating gate 406. Programming NAND flash memory 114 is performed one cell 400 at a time and usually an entire page is programmed in a single operation, as described above. A programmed memory cell 400 inhibits formation of the more highly conductive channel 420 at voltages applied to control gate 402 to form a channel 420 in an erased cell 400, because negative charge stored on floating gate 406 inhibits the electric field produced by control gate 402 from affecting substrate 418. A higher voltage must then be applied to control gate 402 to form the more highly conductive channel 420 in silicon substrate 418. As described above, the programmed state of a cell 400 may be referred to as logic level "0."

The high voltages used in erasing and programming NAND flash memory 114 results in physical changes in oxide insulating layer 408 over the course of many erasing and programming cycles. For example, some NAND flash memory 114 has an expected useful lifetime of about 100,000 erase/program cycles. As the number of erase/program cycles experienced by a cell 400 in NAND flash memory 114 increases, the insulating properties of oxide insulating layer 408 decrease, and the cell 400 eventually ceases functioning. When a number of cells 400 in a block (e.g., $BLOCK_A$ 316a) above a predetermined threshold cease functioning, the respective flash memory controller 112 retires the block from use to prevent data corruption. This reduces the usable storage capacity of SSD 100. In an attempt to counter the wearing out of NAND flash memory 114, processor 104 may execute and monitor a wear-leveling algorithm. As described in further detail below, the wear-leveling algorithm substantially evenly spreads the erase/program cycles over all the memory blocks of NAND flash memory 114.

Figure 5:
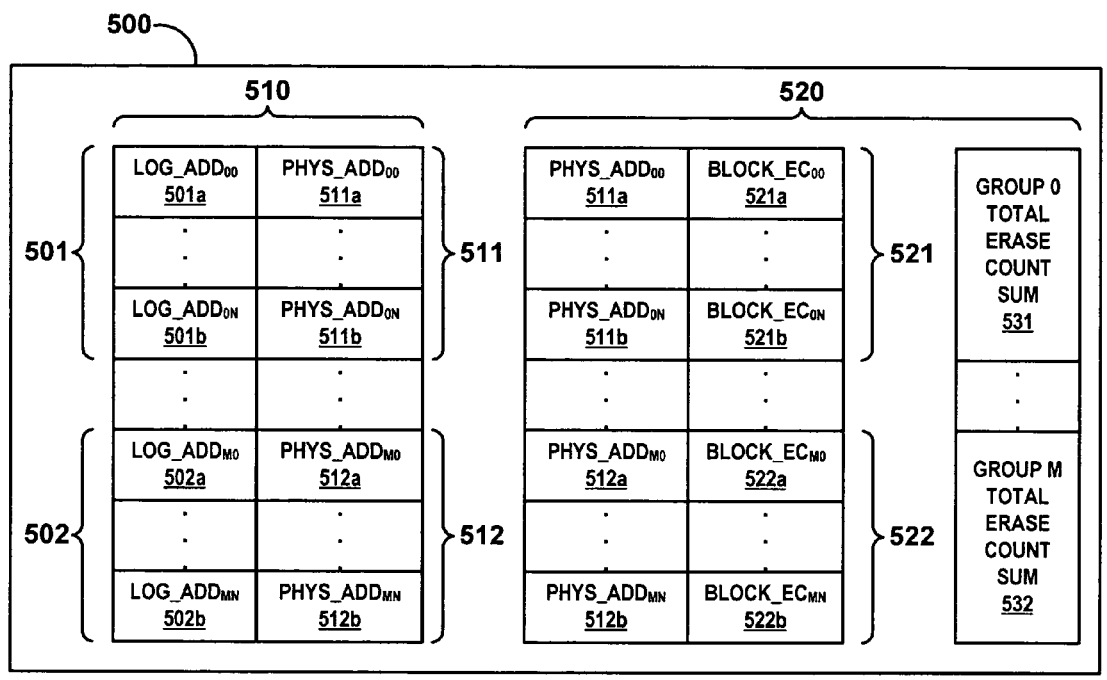
FIG. 5 is a block diagram illustrating an example flash translation layer including an erase count table and associated flash translation layer table.

FIG. 5 illustrates a conceptual block diagram of an example flash translation layer (FTL) 500 stored in MRAM device memory 106. FTL 500 may include a translation mapping table 510 that manages translation of a logical address of data stored in NAND flash memory 114, which is used by the processor of host device 102, to a physical address of the data, which is used by processor 104 and flash memory controllers 112 of SSD 100. For example, the translation mapping table 510 may include a plurality of logical addresses $501a, \ldots, 501b, \ldots, 502a, \ldots, 502b$ (collectively "group 0 logical addresses 501" and "group M logical addresses 502"), and a plurality of corresponding physical addresses $511a, \ldots, 511b, \ldots, 512a, \ldots, 512b$ (collectively "group 0 physical addresses 511" and "group M physical addresses 512"). Because flash translation mapping table 510 converts the logical block address (LBA) used by host device 102 to a physical block address (PBA) used by processor 104 and flash memory controllers 112, host device 102 may use a static LBA for a data file, even when the actual physical location at which the data file is stored changes. For example, $LOG\_ADD_{00}$ 501a may represent the location used by host device 102 for a data file. The corresponding PBA at which the data file is stored is $PHYS\_ADD_{00}$ 511a, which is a physical location (e.g., $BLOCK_A$ 316a) within NAND flash memory 114. In the course of executing a wear-leveling algorithm, as described below, the data file may be moved to a different block (e.g., $BLOCK_B$ 316b) of NAND flash memory 114, which may have a physical address of $PHYS\_ADD_{M0}$ 512a. When the set of data is moved, flash translation mapping table 510 will be updated with the new PBA $PHYS\_ADD_{M0}$ 512a. The new entry in flash translation mapping table 510 will then equate $LOG\_ADD_{00}$ 501a with $PHYS\_ADD_{M0}$ 512a. This allows host device 102 to use a single LBA for the set of data, while allowing the set of data to be moved within NAND flash memory 114.

FTL 500 may also include an erase count table 520, which maintains group erase counts $521a, \ldots, 521b, \ldots, 522a, \ldots, 522b$, (collectively "group 0 erase counts 521," and "group M erase counts 522") for each of physical addresses 511 and 512. For example, when $PHYS\_ADD_{00}$ 511a is erased, the corresponding entry $BLOCK\_EC_{00}$ 521a in erase count table 520 is incremented. This operation is performed similarly for each of the group 0 and M physical block addresses 511 and 512.

Because SSD 100 includes a large number of blocks, each of the plurality of PBAs is included in a respective group. The total erase count for each group is summed to form a group total erase count sum. For example, the erase counts $BLOCK\_EC_{00}$ 521a to $BLOCK\_EC_{0N}$ 521b are summed to form group 0 total erase count sum 531. Similarly, the erase counts $BLOCK\_EC_{M0}$ 522a to $BLOCK\_EC_{MN}$ 522b are summed to form group M total erase count sum 532.

Figure 6:
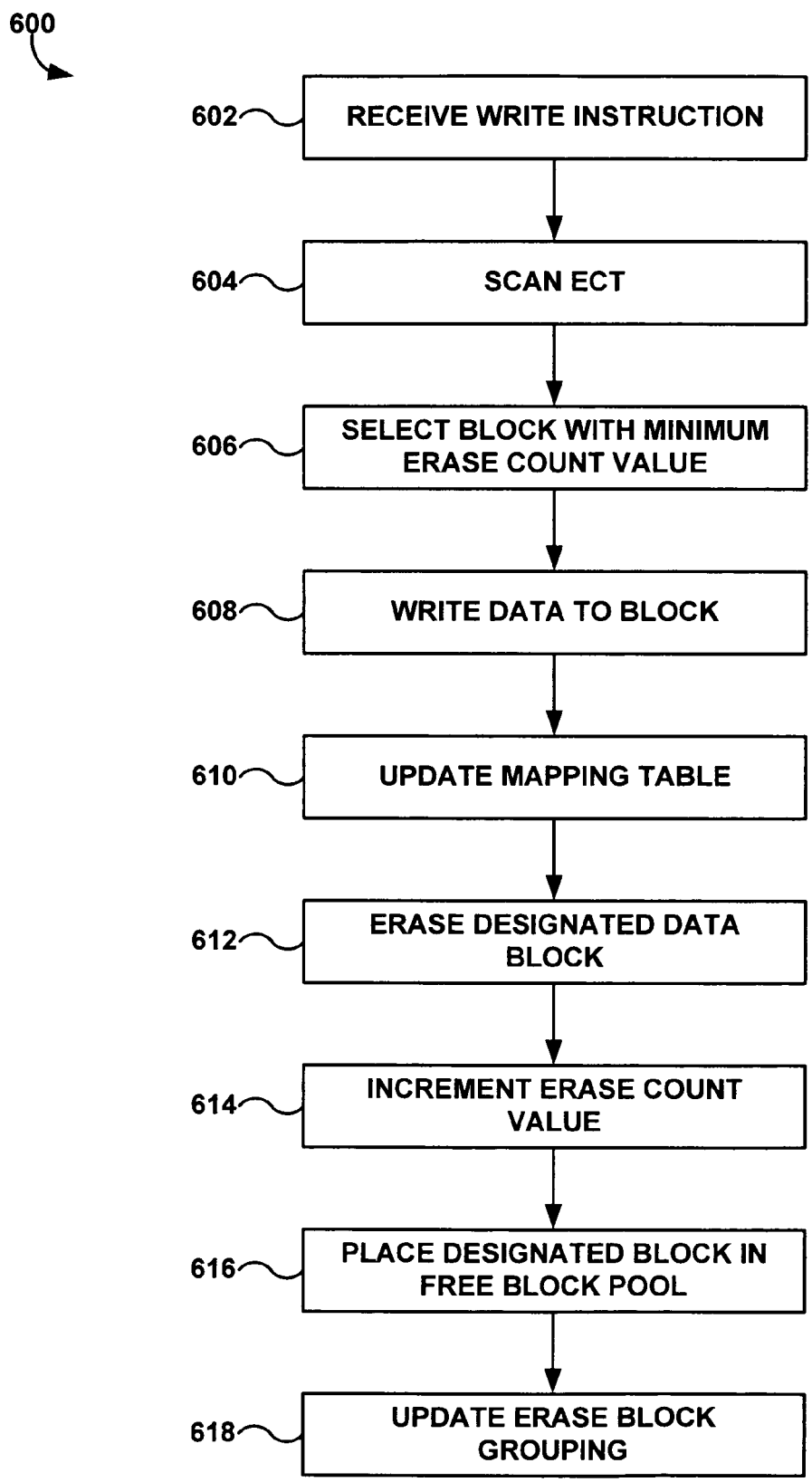
FIG. 6 is a flow diagram illustrating an example dynamic wear-leveling algorithm.

Processor 104 executes one or more wear-leveling algorithms stored in MRAM device memory 106 to manage the wear of BLOCKS 316 of NAND flash memory 114. The wear-leveling algorithms may include a dynamic wear-leveling algorithm, which is performed when data is flushed from buffer 110 and written to NAND flash memory 114, and a static wear-leveling algorithm, which addresses blocks that are inactive with data stored in them for long periods. For example, FIG. 6 shows an example technique 600 according to which processor 104 may execute a dynamic wear-leveling algorithm upon receipt of a write command. The dynamic wear-leveling algorithm may ensure that data program and erase cycles will be evenly distributed throughout all the BLOCKS 316 in NAND flash memory 114. The dynamic wear-leveling algorithm eliminates situations where the application repeatedly writes to the same location until wear out occurs.

Processor 104 first receives a write command from host device 102 (602). The write command includes a logical address to which processor 104 is to write the data received from host device 102. Processor 104 then initiates the dynamic wear-leveling algorithm using FTL 500 stored in MRAM device memory 106, beginning with a scan of erase count table 520 (604). In particular, processor 104 scans a portion erase count table 520 corresponding to a "free block pool." The free block pool includes blocks that are not currently storing data and are thus available to be written to. In some embodiments, the free block pool is maintained as a percentage of the total available blocks. For example, the free block pool may include approximately 2% of the total available blocks. In order to increase the speed of the scan process, processor 104 initially scans the group total erase count sums 531 and 532, and determines and selects the minimum group total erase count sum. Processor 104 then scans the block erase counts 521 or 522 within the selected group total erase count sum 531 or 532. Processor 104 selects the block (e.g., physical address) with the minimum erase count value (606) and directs the data to flash memory controllers 112 to write data to that block (608).

Processor 104 then updates flash translation mapping table 510 to include the new association between the logical address received from host device 102 and the physical address to which the data was written (610). As described above, this allows host device 102 to use the same logical address when the physical address of the stored data changes. Processor 104 then directs flash memory controllers 112 to erase the block that has the physical address that previously was linked to the indicated logical address (612). Processor 104 also increments the erase count of the newly erased block in erase count table 520 (614) and places the newly erased block in the free block pool (616). Finally, processor 104 updates the grouping of blocks for calculation of the group total erase count sum 531 or 532 (618) by placing the newly erased block in a group with other erased blocks, and placing the newly written block in a group including other blocks that are currently storing data.

Figure 7:
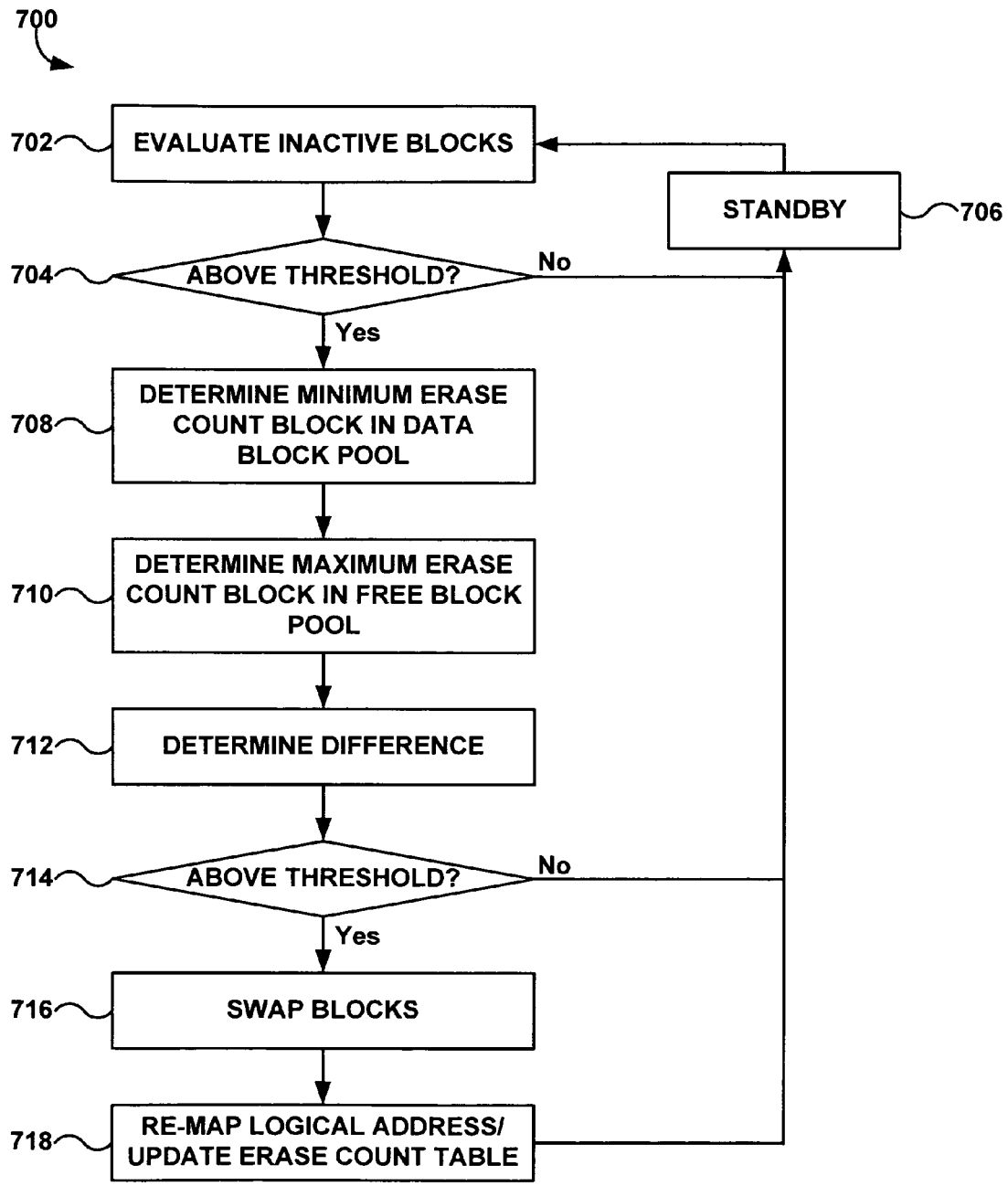
FIG. 7 is a flow diagram illustrating an example static wear-leveling algorithm.

In addition to the dynamic wear-leveling algorithm, processor 104 may also execute and monitor a static wear-leveling algorithm. Dynamic wear-leveling itself cannot ensure that all BLOCKS 316 are being wear-leveled at the same rate. For example, data may be written and stored in a block (e.g., $BLOCK_A$ 316a) for long periods of time or even indefinitely. This block may remain inactive in the dynamic wear-leveling algorithm. As illustrated in the flow diagram of FIG. 7, in executing static wear-leveling algorithm 700, processor 104 first evaluates the idle stage period of inactive blocks (702) and compares the idle stage period of the inactive blocks to a predetermined threshold (704). When the idle stage period of the inactive blocks falls below the threshold, processor 104 proceeds to a standby state (706) and waits for a predetermined time to pass before evaluating the idle stage period of the inactive blocks (702) again.

When processor 104 determines that the idle stage period of one or more inactive blocks falls above the predetermined threshold, processor 104 proceeds to scan erase count table 520 and determines the minimum erase count block (i.e., physical address) in the data block pool (708). While scanning erase count table 520, processor 104 also determines the maximum erase count block (i.e., physical address) in free block pool (710). Processor 104 then subtracts the erase count of the minimum erase count block from the erase count of the maximum erase count block to determine an erase count difference (712). The processor compares the erase count difference to a threshold erase count difference value (714), and when the erase count difference falls below the threshold erase count difference value, returns to a standby state (706).

However, when the erase count difference falls above the threshold erase count difference value, processor 104 may swap the data of the minimum erase count block in the data block pool to the maximum erase count block in the free block pool (716). Processor 104 swaps the data by first writing the data to the maximum erase count block in the free block pool, then erasing the data from the minimum erase count block in the data block pool. The newly written to maximum erase count block is then associated with the data block pool, and the newly erased minimum erase count block is associated with the free block pool. With the block swap completed, processor 104 updates FTL 500 to re-map the LBA of the data to the new PBA and updates erase count table 520 with the new erase count and the new block associations (718). Processor 104 then enters the standby state and waits for a predetermined time period to pass before evaluating the idle stage period of the inactive blocks (702) again.

Because MRAM device memory 106 is non-volatile, processor 104 does not need to periodically back up the data stored by MRAM device memory 106 to NAND flash memory 114. This may simplify the dynamic wear-leveling algorithm described in FIG. 6 and static wear-leveling algorithm 700 described in FIG. 7, because processor 104 may not need to include the data stored by MRAM device memory 106 (e.g., FTL 500) in the wear leveling algorithm. Further, eliminating the need to back up the data stored by MRAM device memory 106 may increase the life of SSD 100 by eliminating the write/erase cycles associated with backing up the data stored by MRAM device memory 106 (e.g., FTL 500) to NAND flash memory 114.

Figure 8:
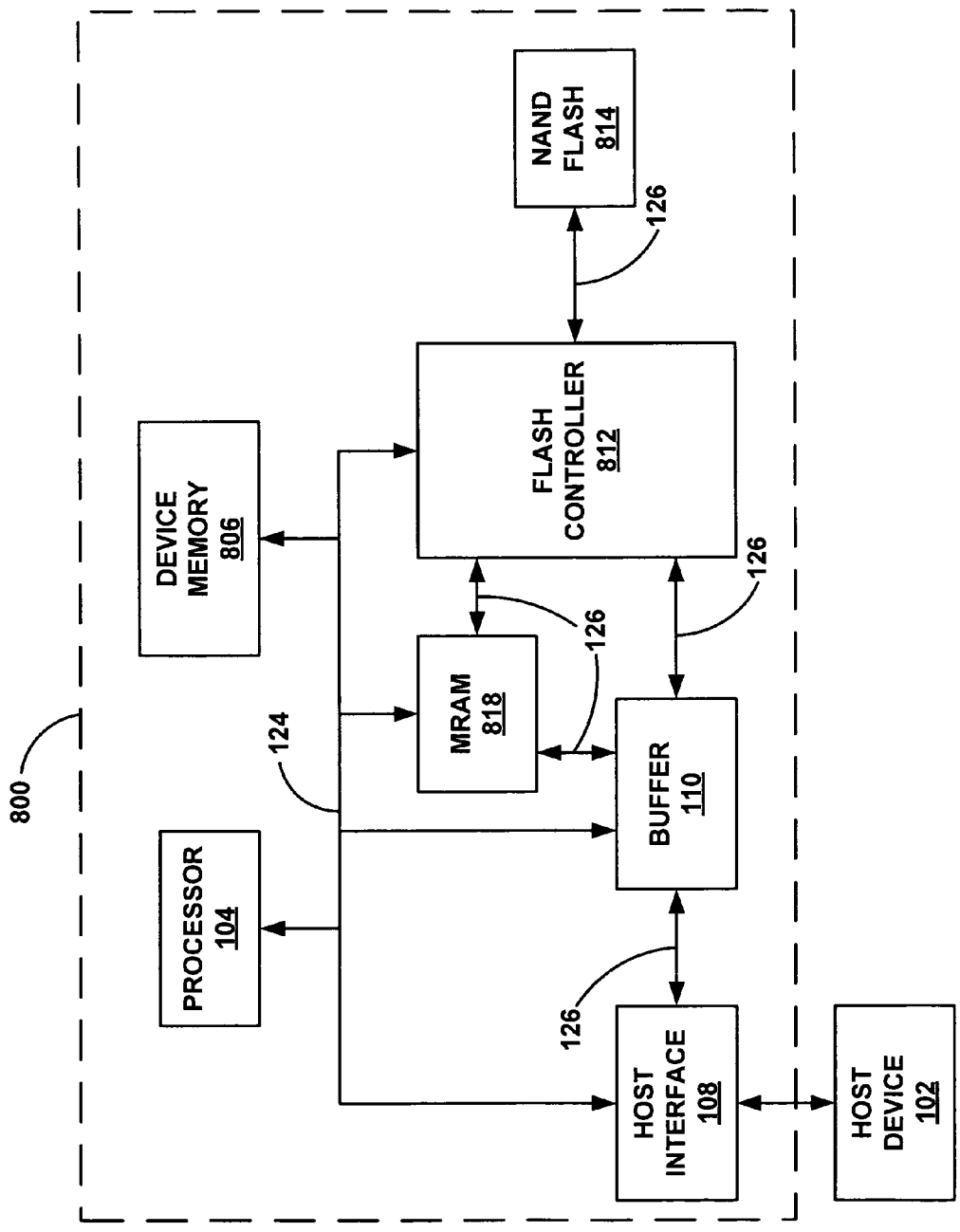
FIG. 8 is a schematic block diagram illustrating an example solid state drive including a MRAM high write volume memory.

In another embodiment, the disclosure is directed to an SSD 800 including a high write volume MRAM 818, as illustrated in a schematic block diagram shown in FIG. 8. SSD 800 is electrically coupled to a host device 102 via a host interface 108, similar to SSD 100 described with respect to FIG. 1. Host interface 108 connects to a data bus 126 and a control bus 124, and data bus 126 forms data pathway from host interface 108 to NAND flash memory 814. Control bus 124 connects to processor 104, a device memory 806, buffer 110 and flash memory controller 812.

In some embodiments, device memory 806 may be MRAM, as described above with respect to FIG. 1, while in other embodiments, device memory 806 may be SRAM or another suitable memory format.

Flash memory controller 812 and NAND flash memory 814 may be similar to the flash memory controllers 112 and NAND flash memory 114 described with respect to FIG. 1, and may comprise one or more flash memory channels and associated flash memory controllers. In some embodiments, SSD 800 includes a single flash memory controller 812 and a single NAND flash memory channel 814.

High write volume MRAM 818 electrically connects to flash controller 812 and SDRAM buffer 110 via data bus 126, and receives commands from processor 104 via control bus 124. High write volume MRAM 818 may provide a storage location for data that is frequently written to SSD 800 by host device 102. For example, a data file ("file") used by host device 102 such as, for example, a word processing document that is being edited may be written to high write volume MRAM 818 during the time when the document is being edited to reduce the number of read/write cycles that NAND flash memory 814 experiences. Other files may also be saved to high write volume MRAM 818, including, for example, files used by an operating system of host device 102, files used by other programs executed by host device 102, or the like. The algorithms for determining when a file is stored in high write volume MRAM 818 and when the file is released from MRAM 818 and written to the NAND flash memory 814 are described below with reference to FIGS. 10 and 11.

Figure 9:
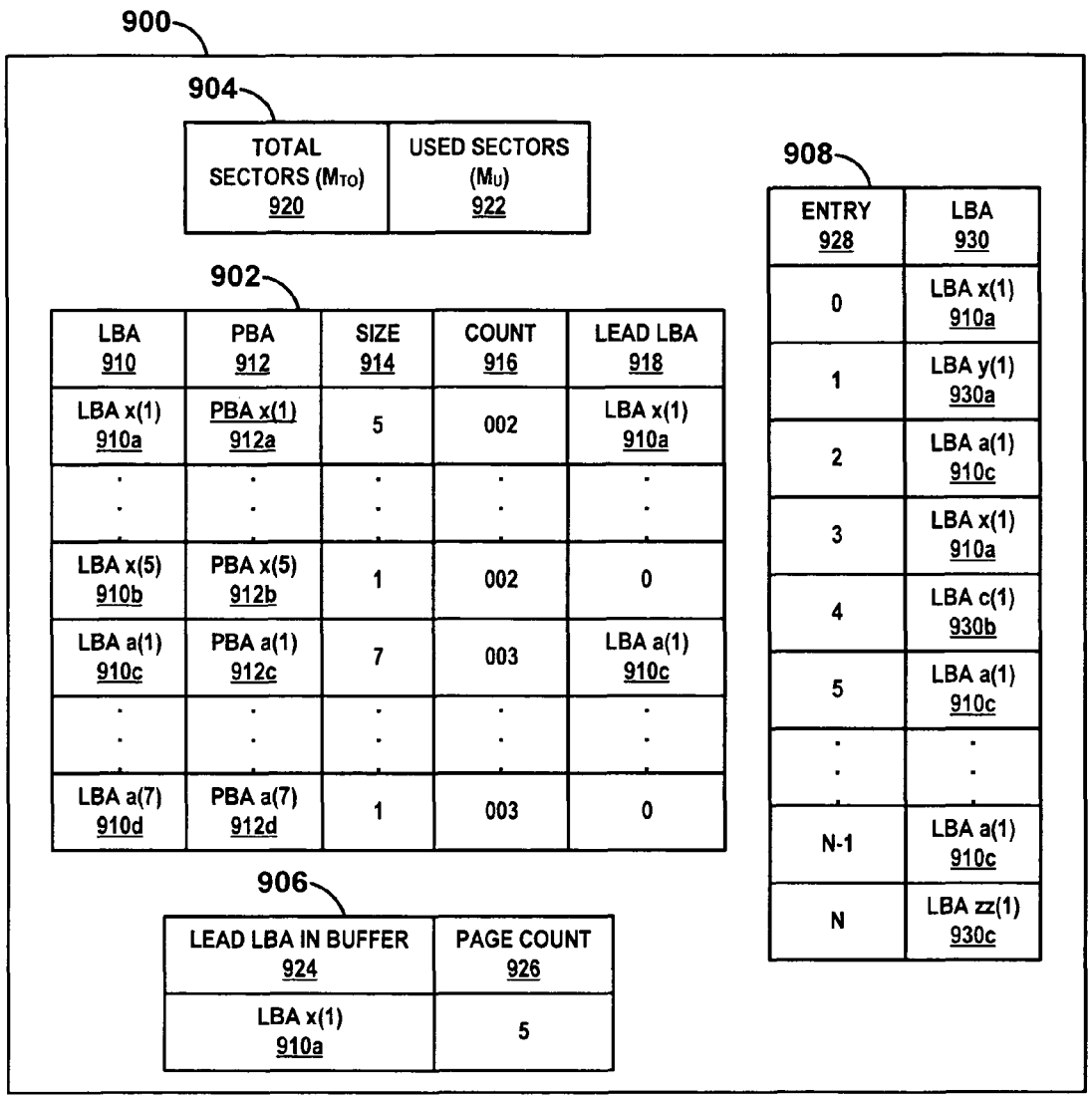
FIG. 9 is a block diagram illustrating an example MRAM translation layer (MTL).

To facilitate use of high write volume MRAM 818, device memory 806 may store a MRAM translation layer 900, which is illustrated in a block diagram in FIG. 9. MRAM translation layer 900 may include an address map 902, which stores a translation of logical block addresses 910 used by host device 102 to physical block addresses 912 used by processor 104 of SSD 800 to refer to sectors in high write volume MRAM 818. MRAM translation layer 900 may also include a MRAM utilization table 904, which stores counts of the total number of MRAM sectors ($M_{TO}$) 920 and total MRAM sector utilization ($M_U$) 922. MRAM translation layer 900 may also include a lead LBA in buffer registry 906 and a write frequency file buffer 908.

Address map 902 links a logical block address (LBA) 910 of a data file used by host device 102 to a physical block address (PBA) 912 of high write volume MRAM 818 at which the data file is stored. For example, a first file may include five logical block addresses LBA x(1) 910a to LBA x(5) 910b, which are linked in address map 902 to five physical block addresses PBA x(1) 912a to PBA x(5) 912b. Similarly, a second file may include seven logical block addresses LBA a(1) 910c to LBA a(7) 910d, which are linked in address map 902 to seven physical block addresses PBA a(1) 912c to PBA a(7) 912d. Other files may include a lesser or greater number of LBAs 910 and corresponding PBAs 912, depending on the size of the file.

Address map 902 may also store a size 914 for each of LBAs 910. The size 914 indicates how many total LBAs 910 are linked to the file from that LBA 910 forward, including that LBA 910. Thus, the size 914 of the first LBA 910 of the file will include the total number of LBAs 910 corresponding to the file, while each subsequent LBA 910 for the file will have a size 914 decremented by one. For example, the first file includes five logical block addresses LBA x(1) 910a to LBA x(5) 910b, so five LBAs are linked to logical block address LBA x(1) 910a and the size 914 of LBA x(1) 910a is five, while a single logical block address LBA x(5) 910b is linked to LBA x(5) 910b and the size 914 of LBA x(5) 910b is one. Similarly, the second file includes 7 logical block addresses LBA a(1) 910c to LBA a(7) 910d, so seven LBAs (e.g., LBA a(1) 910c to LBA a(7) 910d) are linked to LBA a(1) 910c and the size 914 of LBA a(1) 910c is seven, while a single logical block address LBA a(7) 910d is linked to LBA a(7) 910d and the size 914 of LBA a(7) is one.

Address map 902 may further include a count parameter 916 that is incremented each time the file has been stored in high write volume MRAM 818. In the illustrated embodiment, the first file having logical block addresses LBA x(1) 910a to LBA x(5) 910b has a count of 002, which indicates the first file has been written to high write volume MRAM 818 two times. The second file, which has logical block addresses LBA a(1) 910c to LBA a(7) 910d, has a count of 003, which indicates the second file has been written to high write volume MRAM 818 three times. The count parameter 916 may be cleared when the file is written to NAND flash memory 814, as described in further detail below.

Additionally, address map 902 may include a lead LBA parameter 918, which stores the first LBA 910 of a file. For example, each of LBA x(1) 910a to LBA x(5) 910b are associated with the first file, and thus the first LBA is LBA x(1) 910a. Similarly, each of LBA a(1) 910c to LBA a(7) 910d are associated with the second file, and thus the lead LBA is LBA a(1) 910c. The lead LBA parameter 918 is set to the first LBA for the file in the row corresponding to the first LBA for the file, while the lead LBA parameter 918 is set to 0 for the remaining LBAs associated with the file.

The first LBA in buffer registry 906 may store a first LBA 924 for each of the files stored in buffer 110 and a page count 926, which is the total number of LBAs associated with the file in buffer 100. The files in buffer 110 are waiting to be written to either NAND flash memory 814 or high write volume MRAM 818. For example, in FIG. 9, LBA x(1) 910a is the lead LBA of the first file stored in buffer 110, and has associated with it a total of 5 LBAs. The first LBA in buffer registry 906 is used to track the utilization of high write volume MRAM 818 when files are written to or removed from MRAM 818.

Write frequency file buffer (WFFB) 908 tracks N+1 files (entries 0-N) most recently written to SSD 800. Entry 0 in WFFB 908 stores the lead LBA parameter 918 of the file most recently written to SSD 800, which in FIG. 9 is LBA x(1) 910a. Entries 0-N of WFFB 908 store lead LBA parameters 918 of recently written files in chronological order, with entry 0 being the lead LBA parameter 918 of the most recently written file, and entry N (LBA zz(1) 930c) being the lead LBA parameter 918 of the least recently written file tracked by the WFFB 908. The number value N may be adjusted depending on the size of high write volume MRAM 818, and may be larger for a larger MRAM 818 and smaller for a smaller MRAM 818. When a file is written to SSD 800, regardless of whether the file is written to high write volume MRAM 818 or NAND flash memory 814, the lead LBA parameter 918 of the file is placed in entry 0 of WFFB 908, each of the remaining entries in the table are incremented one value greater (e.g., previous entry 0 is now entry 1, previous entry N−1 is now entry N) and previous entry N is discarded.

Figure 10:
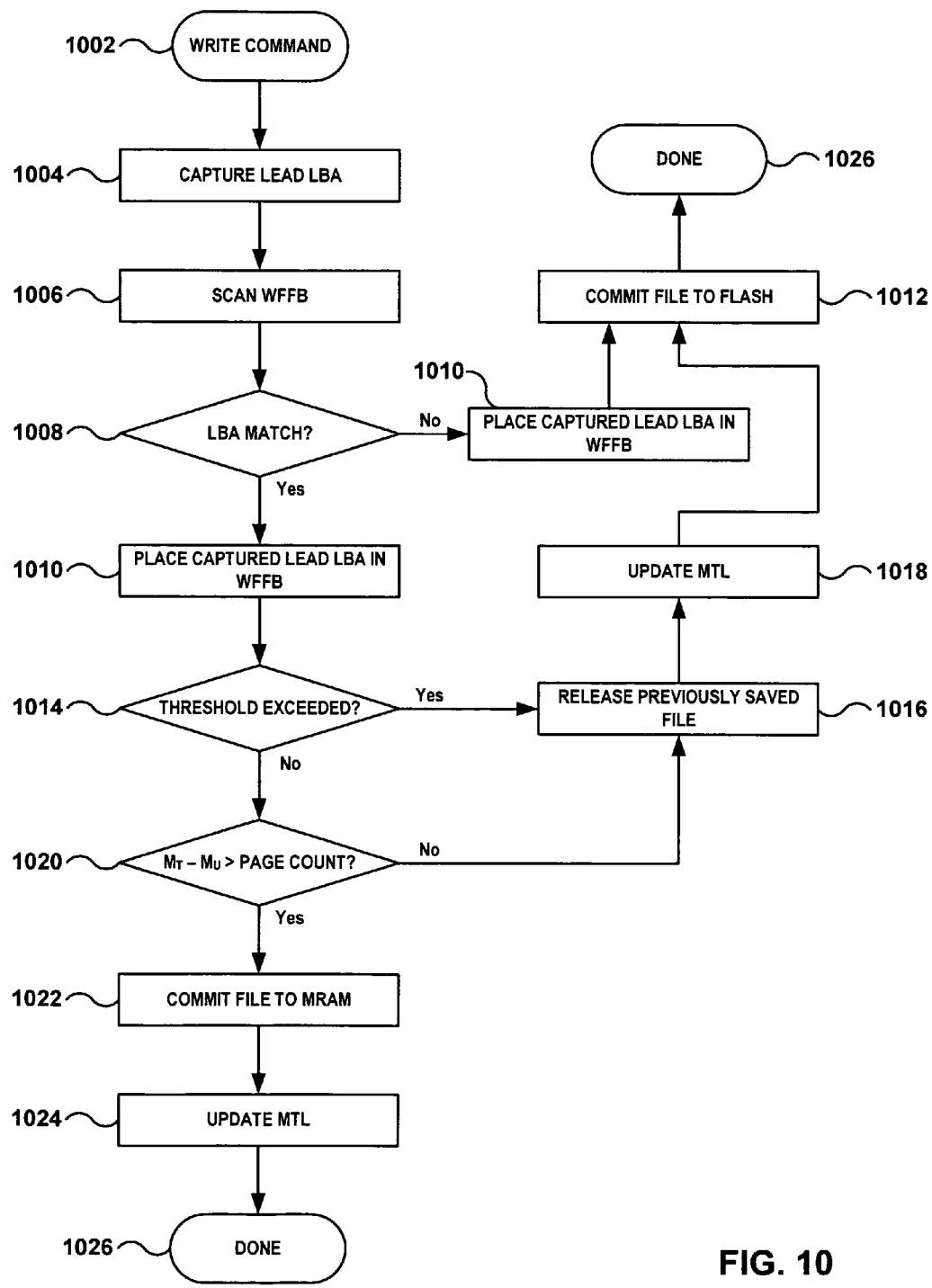
FIG. 10 is a flow diagram illustrating an example technique of storing data in a MRAM high write volume memory.

FIG. 10 illustrates an example algorithm by which processor 104 may utilize MRAM translation layer 900 and high write volume MRAM 818. First, processor 104 receives a write command and a data file with associated LBAs 910 from host device 102 (1002). Processor 104 captures the lead LBA 918 of the file (1004) and compares the lead LBA parameter 918 of the file to the plurality of lead LBAs 918 stored in WFFB 908 (1006). When processor 104 determines that the lead LBA 918 of the file does not match any of the plurality of LBAs 918 stored in WFFB 908, processor 104 places the captured lead LBA 918 in entry 0 of WFFB 908, increments the remaining entries in WFFB 908 and discards the lead LBA 918 previously stored in entry N of WFFB 908 (1010). Processor 104 then instructs flash memory controller 812 to write the file to NAND flash memory 814 (1012) and ends the algorithm (1026).

When processor 104 determines that the lead LBA 918 of the file matches at least one entry in WFFB 908 (1008), processor 104 places the captured lead LBA 918 in WFFB 908, increments the remaining entries in WFFB 908 and discards the lead LBA 918 previously stored in entry N of WFFB 908 (1010). Processor 104 proceeds to determine if the size of the file exceeds a cache queuing threshold (1014), which is a threshold used to determine whether the file will fit in high write volume MRAM 818. In some embodiments, the cache queuing threshold may be adaptively changed based on memory allocation of high write volume MRAM 818 and an average file size.

When the cache queuing threshold is exceeded, processor 104 instructs that a file stored in high write volume MRAM 818 be released and written to NAND flash memory 814 by flash memory controller 812 (1016). In some embodiments, the file may be the file stored in MRAM 818 for the longest time, or may be the file stored in MRAM 818 that has been written the least amount of times, according to the count parameter 916. Processor 104 then updates MRAM translation layer 900 by disassociating the PBAs 912 from the LBAs 910 of the file that was released from MRAM 818 (1018), writes the file to NAND flash memory 814 (1012) and ends the algorithm (1026).

When processor 104 determines the cache queuing threshold is not exceeded (1014), processor 104 performs a final space check by comparing the page count 926 of the file to the difference between the total number of MRAM sectors ($M_{TO}$) 920 and the total MRAM sector utilization ($M_U$) 922 (1020). When the page count 926 of the file exceeds the available sectors in MRAM 818, processor 104 determines that the file is too large to be written to MRAM 818. Processor 104 then instructs that a file stored in high write volume MRAM 818 be released and written to NAND flash memory 814 by flash memory controller 812 (1016). Processor 104 updates MRAM translation layer 900 by disassociating the PBAs 912 from the LBAs 910 of the file that was released from MRAM 818 (1018), writes the file to NAND flash memory 114 (1012) and ends the algorithm (1026).

When processor 104 determines that the page count 926 of the file does not exceed the available sectors in high write volume MRAM 818, processor 104 writes the file to high write volume MRAM 818 (1022) and updates MRAM translation layer 900 to link the LBAs of the file to the PBAs in MRAM 818 at which the file is written (1024). Processor 104 then ends the algorithm (1026).

Figure 11:
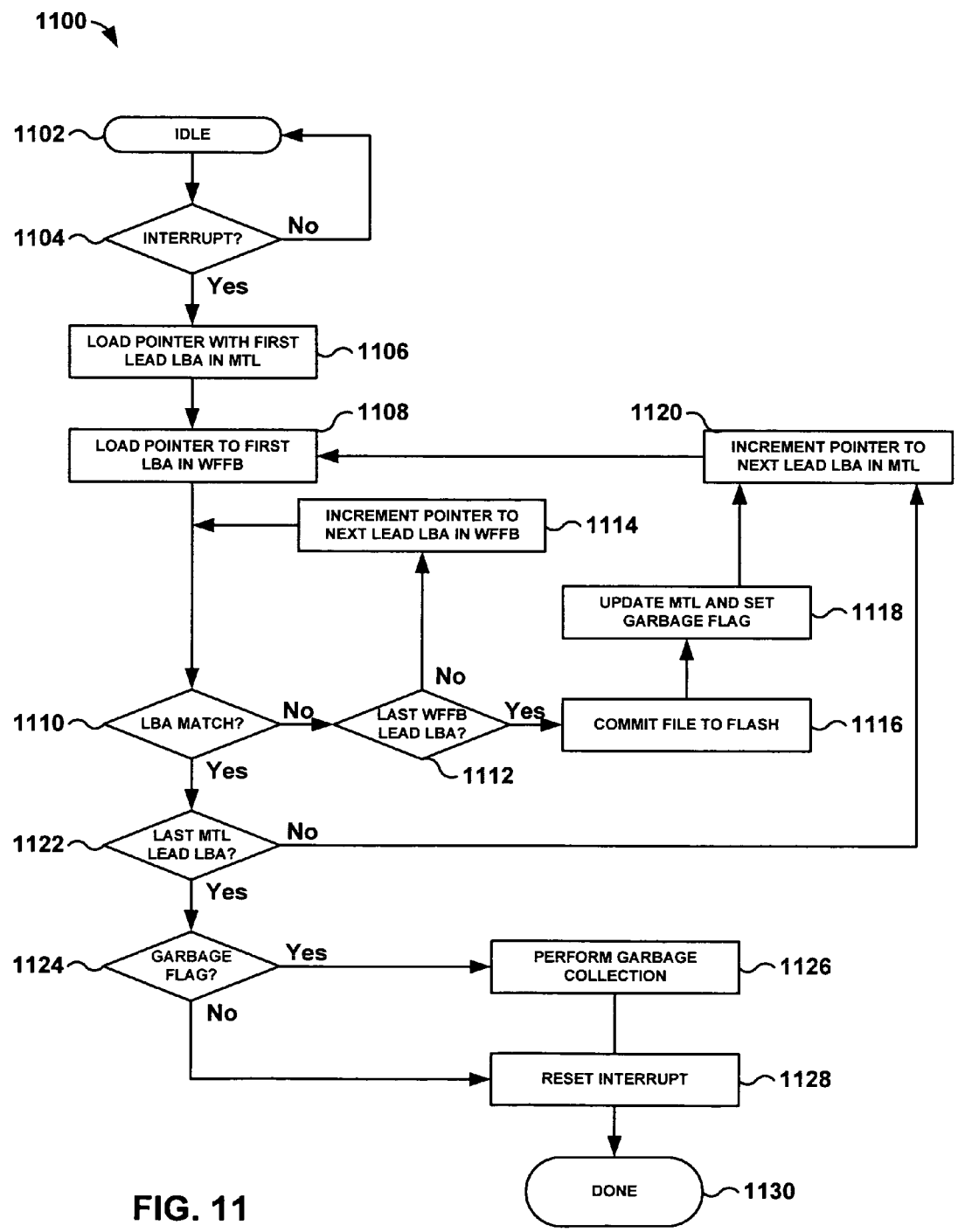
FIG. 11 is a flow diagram illustrating an example technique of releasing low activity files stored in a MRAM high write volume memory.

FIG. 11 illustrates a flow chart of an example algorithm 1100 that processor 104 may perform to release a low activity file from high write volume MRAM 818. By releasing a low activity file from high write volume MRAM 818, processor 104 may free up additional space in MRAM 818 for files that are being written at a higher frequency. Initially, processor 104 is in an idle state (1102) and determines if a timer buffer interrupt should be performed (1104). If processor 104 determines that the timer buffer interrupt should not be performed, processor 104 returns to the idle state (1102). However, when processor 104 determines the time buffer interrupt should be performed, processor 104 loads a MTL pointer with the first lead LBA parameter 918 stored in address map 902 of MRAM translation layer 900 (i.e., the lead LBA parameter 918 of the first file stored in high write volume MRAM 818) (1106). Processor 104 also loads a WFFB pointer to the first lead LBA parameter 918 stored in WFFB 908 (i.e., the lead LBA 918 of the most recently written file) (1108). Processor 104 then compares the MTL pointer to the WFFB pointer to determine whether the lead LBA parameters 918 indicated by the respective pointers match (1110).

When the lead LBAs 918 indicated by the MTL pointer and the WFFB pointer do not match, processor 104 proceeds to determine whether the WFFB pointer points to the last lead LBA 918 in WFFB 908 (e.g., entry N of WFFB 908) (1112). When processor 104 determines that the WFFB pointer does not point to the last lead LBA 918 in WFFB 908, processor 104 increments the WFFB pointer to the next lead LBA 918 stored in WFFB 908 (1114) and compares the new WFFB pointer to the MTL pointer (1110). However, when processor 104 determines that the WFFB pointer does point to the last lead LBA 918 in WFFB 908, processor 104 concludes that the file with the lead LBA 918 indicated by the MTL pointer has not been written in some time and coordinates the writing of the file to NAND flash memory 814 under control of flash memory controller 812 (1116). Processor 104 also updates MRAM translation layer 900 by disassociating the LBAs 910 of the file from the PBAs 912 at which the file was stored in high write volume MRAM 818 and sets a flag indicating that a garbage collection algorithm is to be executed upon completion of the algorithm 1100 (1118). Processor 104 then increments the MTL pointer to the next lead LBA 918 stored in address map 902 of MRAM translation layer 900 (1120), loads a WFFB pointer to the first lead LBA 918 stored in WFFB 908 (1108) and returns to comparing the WFFB pointer to the MTL pointer to determine if the respective lead LBAs 918 indicated by the WFFB pointer and the MTL pointer match (1110).

When processor 104 determines the lead LBAs 918 indicated by the WFFB pointer and the MTL pointer do match, the file is maintained in high write volume MRAM 818. Processor 104 proceeds to determine whether the lead LBA 918 indicated by the MTL pointer is the last lead LBA 918 stored in address map 902 of MRAM translation layer 900 (1122). When the lead LBA 918 indicated by the MTL pointer is not the last lead LBA 918 stored in address map 902, processor 1120 increments the MTL pointer to the next lead LBA 918 in address map 902 (1120), loads a WFFB pointer to the first lead LBA 918 stored in WFFB 908 (1108) and returns to comparing the WFFB pointer to the MTL pointer to determine if the respective lead LBAs 918 indicated by the WFFB pointer and the MTL pointer match (1110).

When processor 104 determines that the lead LBA 918 indicated by the MTL pointer is the last lead LBA 918 stored in address map 902, processor 104 determines whether a garbage collection flag has been set (1124). When processor 104 determines that a garbage collection flag has been set, processor 104 performs a garbage collection algorithm to deal with any fragmented memory in high write volume MRAM 818 (1126). Processor 104 then resets the timer buffer interrupt to indicate that the algorithm 1100 has been performed (1128) and ends the algorithm 1100 (1130). When processor 104 determines that a garbage collection flag has not been set, processor 104 simply resets the timer buffer interrupt to indicate that the algorithm 1100 has been performed (1128) and ends the algorithm 1100 (1130).

The use of high write volume MRAM 818 may improve the performance and/or extend the life of SSD 800. For example, use of high write volume MRAM 818 may reduce the read and/or write times compared to read and/or write times of NAND flash memory 814. As described in further detail above, MRAM has approximately the same write and read speeds as SRAM, which is greater than the write and read speeds of NAND flash memory. This may be especially advantageous for data that is being read from and/or written to SSD 800 frequently. The use of high write volume MRAM 818 may also reduce the number of write/erase cycles experienced by NAND flash memory 814, which may prolong the useful life of flash memory 814. Further, MRAM does not wear by any known mechanism, so wear of the sectors of high write volume MRAM 818 is not a concern, and wear leveling does not need to be performed. Moreover, MRAM is non-volatile and has a 20 year guaranteed data retention, thus SSD 800 does not need to include a power source to power high write volume MRAM 818 in event of a power interruption.

Figure 12:
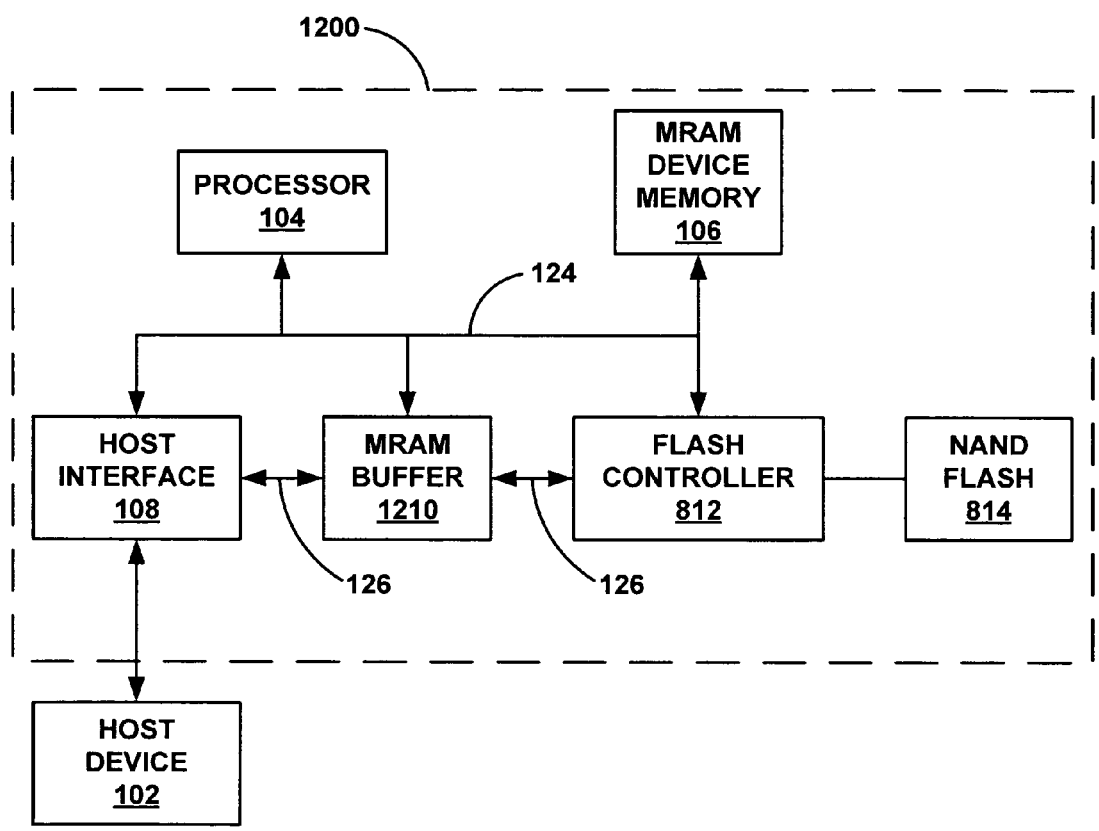
FIG. 12 is a schematic block diagram illustrating an example solid state drive including a MRAM buffer.

In another embodiment, the disclosure is directed to an SSD 1200 including a MRAM buffer 1210, as illustrated in the conceptual block diagram shown in FIG. 12. MRAM buffer 1210 may eliminate the need for SSD 1200 to include a battery or capacitor to provide temporary power to allow processor 104 to write the contents of MRAM buffer 1210 to NAND flash memory 814 in the event of a power interruption to SSD 1200.

Figure 13:
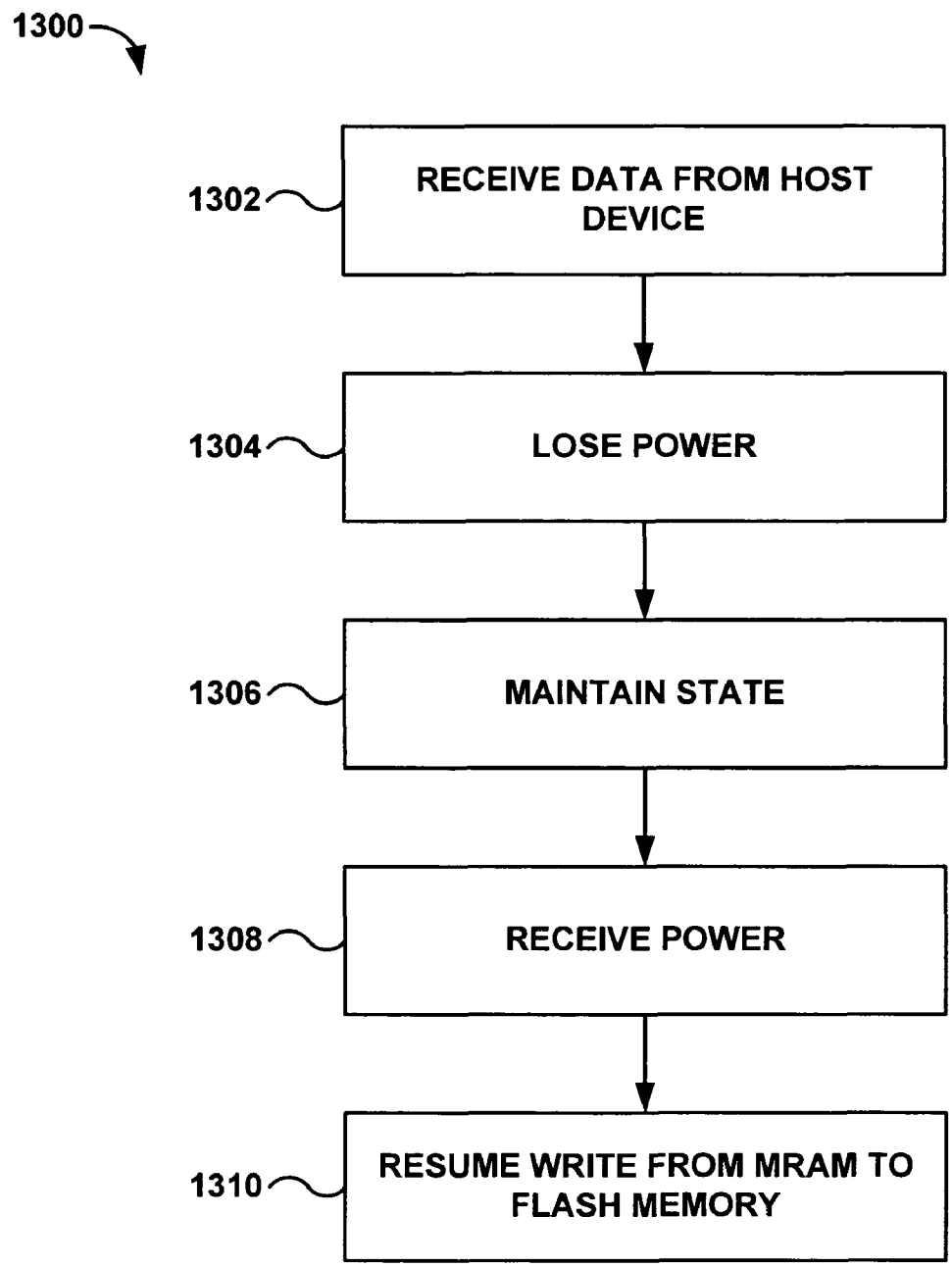
FIG. 13 is a flow diagram illustrating an example operation of a flash based memory device utilizing a MRAM buffer.

FIG. 13 is a flow chart illustrating one example technique 1300 which processor 104 implements upon receipt of data from host device 102 and a subsequent interruption of power. Initially, processor 104 receives a write command from host device 102 via host interface 108 and substantially simultaneously, MRAM buffer 1210 receives the data to be written from host device 102 via host interface 108 (1302). SSD 1200 may then lose power, due to, for example, intentional powering down of the host device 102 in response to a user input, unintentional powering down of the host device 102 in response to an interruption of power to the host device 102, disengagement of the SSD 1200 from host device 102, or the like (1304). Because the memory cells (e.g., cell 200) of MRAM buffer 1210 store data as magnetic moment orientations, as described above, MRAM buffer 1210 maintains the state which each of the cells 200 are in at the time of the power interruption (1306). When power is restored to SSD 1200 (1308), processor 104 causes the data stored in MRAM buffer 1210 to be written to NAND flash memory 814 under control of flash memory controller 812 (1310). In this way, the MRAM buffer 1210 simplifies operation of the SSD 1200 by eliminating the need for a battery or capacitor to provide power for writing data in MRAM buffer 1210 to NAND flash memory 814 upon a power interruption.

Additionally, in some embodiments, the MRAM buffer 1210 may also function similar to the high write volume MRAM 818 described with respect to FIGS. 8-11. For example, a first portion of MRAM buffer 1210 may be dedicated to storing high write volume data files, while a second portion of MRAM buffer 1210 may be dedicated to use as a buffer for data received from host device 102 and waiting to be written to the first portion of MRAM buffer 1210 or NAND flash memory 814.

While the use of MRAM as a device memory, a buffer, or a high write volume memory has been described largely independently of each other, MRAM may be used for more than one of these memories in a single device. For example, use of MRAM for both a MRAM device memory 106 and a MRAM buffer 1210 may substantially eliminate the need for a battery or capacitor to provide back up power for the SSD 1200. As another example, utilizing a high write volume MRAM 818 and a MRAM device memory 106 may extend the useful life of an SSD 100 (or SSD 800 or SSD 1200) by reducing the number of write/erase cycles experienced by NAND flash memory 114 or 814.

Various embodiments of the invention have been described. These and other embodiments are within the scope of the following claims.

The invention claimed is:

1. A storage device comprising:
   flash memory;
   a host interface for communicating with a host device;
   a processor that receives commands from the host device via the host interface and coordinates at least one of addressing, programming, erasing and reading of data to or from the flash memory;
   a buffer electrically connected between the host interface and the flash memory; and
   a high write volume magnetoresistive random access memory (MRAM) electrically connected between the host interface and a flash controller, wherein the processor compares a logical block address of a data file to a plurality of logical block addresses stored in a write frequency file buffer table, causes the data file to be written to the high write volume MRAM when the logical block address of the data file matches at least one of the plurality of logical block addresses stored in the write frequency file buffer table and a size of the data file is less than or equal to an available space in the high write volume MRAM, and causes the data file to be written to the flash memory when the logical block address of the data file matches at least one of the plurality of logical block addresses stored in the write frequency file buffer table and the size of the data file is greater than the available space in the high write volume MRAM memory.

2. The storage device of claim 1, wherein the storage device is a solid state drive (SSD).

3. The storage device of claim 1, wherein the processor causes the data file to be written to the flash memory when the logical block address of the data file does not match any of the plurality of logical block addresses stored in the write frequency file buffer table.

4. The storage device of claim 1, further comprising a MRAM device memory that stores the write frequency file buffer table.

5. The storage device of claim 4, wherein the MRAM device memory stores a MRAM translation layer and a flash translation layer, wherein the MRAM translation layer comprises the write frequency file buffer table and a MRAM address map, and wherein the flash translation layer comprises at least one of erase count tables and flash translation layer tables.

6. The storage device of claim 5, wherein the processor causes the MRAM translation layer and the flash translation layer to be stored in the MRAM device memory without causing writing of the control information to the flash memory.

7. A method comprising:
comparing a logical block address of a data file to a plurality of logical block addresses stored in a write frequency file buffer; and
writing the data file to a high write volume magnetoresistive random access memory (MRAM) when the logical block address of the data file matches at least one of the plurality of logical block addresses stored in the write frequency file buffer and a size of the data file is less than or equal to an available space in the high write volume MRAM; and
writing the data file to a flash memory when the logical block address of the file matches at least one of the plurality of logical block addresses stored in the write frequency file buffer and the size of the data file is greater than the available space in the high write volume MRAM.

8. The method of claim 7, further comprising:
updating an MRAM translation layer address table with the physical address at which the data file is written.

* * * * *